United States Patent [19]

Medina Vega

[11] Patent Number: 5,352,264
[45] Date of Patent: Oct. 4, 1994

[54] SEED HULL EXTRACTS

[76] Inventor: Luis R. Medina Vega, Diego de Vilchis No. 2956, Chihuahua, Chihuahua, Mexico

[21] Appl. No.: 775,460

[22] Filed: Oct. 15, 1991

[51] Int. Cl.$^5$ .......................... C05F 5/00; C13K 1/02; C05C 9/00
[52] U.S. Cl. ........................................ 71/23; 71/28; 71/63; 71/64.1; 71/64.13; 127/37; 127/40
[58] Field of Search ...................... 71/1, 11, 23, 24, 27, 71/28, 63, 64.13, 64.1; 127/37, 40

[56] References Cited

U.S. PATENT DOCUMENTS

| | | | |
|---|---|---|---|
| 2,362,390 | 11/1944 | Millar | 71/23 |
| 3,259,501 | 7/1966 | Ulrey | 71/23 X |
| 4,168,988 | 9/1979 | Riehm et al. | 127/37 |
| 4,579,579 | 4/1986 | Kerr | 71/23 |
| 4,698,090 | 10/1987 | Marihart | 71/24 |

OTHER PUBLICATIONS

CA 109(18): 151904t, Glikmons, 1987. "Procedure for . . . furfural".
CA 88(3):20849d, Jelks, 1977, "Increasing . . . acid".

*Primary Examiner*—Ferris H. Lander
*Attorney, Agent, or Firm*—Milton D. Wyrick

[57] ABSTRACT

A method for the preparation of compositions for modifying crop yield and fruit development including extracting a mixture of polyhydroxycarboxylic acids, carbohydrates, phenols and alcohols, from vegetable residues such as rice and oat hulls, and the compositions resulting from the method. Methods for use of these compositions for modifying crop yield and fruit development are also disclosed.

12 Claims, No Drawings

SEED HULL EXTRACTS

The present invention generally relates to processes, compositions and uses as regulators of plant growth and fruit growth, and more specifically, to the preparation of mixtures of polyhydroxycarboxylic acids, carbohydrates, and alcohols by extraction from vegetable residues for improving crop yield and fruit development and for conditioning of soil.

Studies done by the present inventor have revealed that rice and oat hulls are excellent and economical sources from which xyloses could be extracted with a good rate of return. From this initial finding, research was begun seeking mixtures of metallic complexes and/or ammonium salts having properties for the conditioning of soil and plant growth biostimulation using a mixture of polyhydroxycarboxylic acids, carbohydrates, and alcohols which have adequate sequestering and plant nutrition properties.

The constituents of interest, pentosanes and other carbohydrates, which may be obtained from rice and oat hulls, belong to a group of lignocellulosic compounds. Prior research has defined the term "hemicellulose" as a constituent group of the cellular membranes differing from cellulose, and which is easier to extract by alkalies, or by hydrolysis with diluted mineral acids, obtaining some hexoses, but primarily pentoses.

The hemicellulose of the rice or oat hulls is of the glucoxylane type, with xyloses as its main hydrolysis product. This means that rice or oat hulls are the more feasible materials to use in the high yield extraction of pentoses for a later transformation to polyhydroxycarboxylic acids.

Polyhydroxycarboxylic acids form the basis of the present invention, allowing the formulation of mixtures of metallic complexes and/or ammonium salts. These compounds find use as soil conditioners and, as plant growth and fruit filling enhancers.

It is therefore an object of the present invention to utilize industrial rice and oat hulls as sources of pentoses for later transformation to polyhydroxycarboxylic acids.

It is another object of the present invention to provide a mixture of metallic complexes and/or ammonium salts obtained from polyhydroxycarboxylic acids for agricultural applications.

It is a further object of the present invention to provide mixtures of polyhydroxycarboxylic acids and carbohydrates for use as a metal complexing agent.

It is a still further object of the present invention to provide a mixture of polyhydroxycarboxylic acids, carbohydrates, and alcohols for use as plant growth stimulators with plant nutrition properties.

It is another object of the present invention to provide improved plant growth biostimulating compositions capable of modifying the vegetative growth and fruiting of plants on which they are applied.

It is still another object of the present invention to provide plant growth enhancers and a method for the use thereof which can be employed dependably and in a manner fully compatible with other agricultural and manufacturing practices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention comprises a method of preparing a mixture of polyhydroxycarboxylic acids, carbohydrates, and alcohols, comprising the steps of extracting pentoses from vegetable residues with a diluted solution of nitric acid having a liquid/solid ratio of 3:1 to 5:1, followed by injecting steam into the extracted pentoses, the steam having a pressure of 7.0 to 9.0 kg/cm$^2$ to agitate the mixture and to raise the temperature of the mixture to a temperature of 75°–85° C. for a period of 8–20 hours, thereby oxidizing the pentoses to polyhydroxycarboxylic acids and oxidation products. The final step involves clarifying and concentrating the polyhydroxycarboxylic acids and the oxidation products by evaporating the polyhydroxycarboxylic acids and the oxidation products at a pressure of 145–200 mm Hg absolute and a maximum temperature of 45°–60° C.

DETAILED DESCRIPTION

The present invention relates generally to the production of mixtures which are extremely useful as soil conditioning agents, plant growth biostimulants and fertilizer additives for agricultural uses obtained from rice and oat hulls which might otherwise be discarded and added to what is becoming an overwhelming landfill problem. The invention accomplishes this through a process which will be thoroughly disclosed in the following paragraphs and in the examples. Basically, the invention involves the extraction of polyhydroxycarboxylic acids, carbohydrates, and alcohols from vegetable residues, primarily from rice and oat hulls.

The reaction sequence of the present invention will be described as involving three phases. The first phase involves the extraction of pentoses from the residual rice or oat hulls by an acid hydrolysis process, and will hereinafter be referred to as the pentoses extraction phase. The second phase is the oxidation phase in which nitric acid is added to the pentoses solution obtained from the pentoses extraction phase, resulting in production of mixtures of monocarboxylic acids, aldehydes, dicarboxylic acids, alcohols, oxalic acid and carbon dioxide. One of the reactions present in the oxidation phase, as a part of the carboxylic acid production, is the formation of 2, 3, 4, tryhydroxypentanedioic acid. In the final phase, the obtained acids from the oxidation phase are vacuum concentrated. In the pentoses extraction phase, nitric acid and water are added to a quantity of rice and/or oat hulls in an acid hydrolysis reaction. Heat, from steam sprayers, is added to obtain the extraction of the desired pentoses.

In the oxidation phase, additional nitric acid is added to the pentoses obtained in the pentoses extraction phase. The following are the main reactions which occur during the oxidation phase:

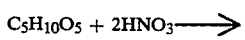

Followed by:

$$CH_2OH(CHOH)_3COOH \longrightarrow COOH(CHOH)_3CHO + H_2$$

And by:

$$COOH(CHOH)_3CHO + HNO_3 \longrightarrow COOH(CHOH)_3COOH + NO_2 + \tfrac{1}{2}H_2$$

In the oxidation phase a mixture of polyhydroxycarboxylic acids, carbohydrates, and alcohols, in aqueous solution is obtained. This mixture is used as the raw material for the production of the metallic complexes and ammonium salts, and other compositions which will be described. The mixture has the following properties:

| Appearance: | Yellowish-clear solution having the odor of fermented glucose; |
|---|---|
| Boiling Point | 107.0–109.0°C. at 760 mm Hg; |
| Density: | 1.020–1.040 g/cc at 20° C.; |
| Total Polyhydroxycarboxylic Acids: | 2.5–3.5% Expressed As Trihydroxypentanedioic Acid; |
| Nitric Acid: | 1.0% $HNO_3$ maximum. |

The complexing action of the mixture of the polyhydroxycarboxylic acids (PHCA) obtained in the oxidation phase is utilized to produce the final products of the invention and will be combined with different additives that give the final products soil conditioning and plant growth biostimulant properties.

The aformentioned reactions refer to the basic solution from which different formulations are made to be used in specific agricultural applications.

Following are two examples of the reactions which occur in the final formulation phase with the polyhydroxycarboxylic acids obtained in the oxidation phase:

$$HOOC-(CHOH)_n COOH + Ca(OH)_2 \longrightarrow Ca[OOC-(CHOH)_n COO] + 2H_2O$$

$$HOOC-(CHOH)_n COOH + 2NH_3 \longrightarrow (NH_4)_2 [OOC-(CHOH)_n-COO]$$

where n can take on the values of 3, 4, 5 and 6.

The following Examples I–II deal with methods for extraction of pentoses from rice and/or oat hulls, the pentoses extraction phase, and the subsequent oxidation phase. Example III deals with the concentration of the acid solution obtained in Example I or Example II.

Examples IV–V deal with production of metallic complexes and ammonium salts, which are the products of the present invention.

Examples VI to XIV deal with production of plant biostimulant products and fertilizer additives, which are also products of the present invention.

EXAMPLE I

Pentoses Extraction Phase

Pentoses extraction from rice and oat hulls was accomplished by action of an acid hydrolysis. Initially, the reactor was loaded with 2,250–10,000 kg of ground rice or oat hulls, or a combination of the two, to a 24–90 mesh. Next, 8,000 to 38,000 liters of water and 700–3,300 kg of nitric acid (54–60% $HNO_3$) were added.

The reactor was closed and connected to the scrubbing system. The reactor employed had 8 steam sprayers that supplied heat and mixing simultaneously to the reacting mixture. The steam pressure was maintained in a range from 7 to 9 k/cm², and the temperature did not exceed 70°–85° C. When a temperature in this range was attained, 475–2,200 kg of additional nitric acid was added. The reacting mixture was maintained in the above temperature range for a period of 4 to 10 hours. This yielded a pentoses solution.

Oxidation Phase

The pentoses solution from the pentoses extraction phase had 375 to 2000 kg of additional nitric acid added to it, and the temperature of the resulting solution was maintained at 70° to 85° C. for 4 to 10 additional hours, by supplying pressurized steam at the proper temperature.

After this period of time had elapsed, the steam was shut off and the solution was allowed to cool. After cooling, the resulting polyhydroxycarboxylic acid solution was drawn off and pumped to storage.

EXAMPLE II

This process was to extract pentoses and consecutive oxidation with nitric acid to obtain the polyhydroxycarboxylic acids. The process began with the loading of the reactor with 2,250 to 10,000 kg of ground rice and/or oat hulls to 34–90 mesh, adding 8,000 to 38,000 liters of water and 750 to 3,000 kg of nitric acid. Steam was fed into the reactor at 7–9 k/cm² to attain the adequate reaction temperature level of 75°–85° C., which temperature was maintained for 8–20 hours. After this period had elapsed, the steam was shut off, and the solution was allowed to cool to room temperature. When cool, the obtained polyhydroxycarboxylic acids solution was decanted and pumped to storage.

The liquid extracts obtained in Examples I and II will hereinafter be referred to as "Composition A."

EXAMPLE III

For concentration of the polyhydroxycarboxylic acid solution obtained in the preceding examples, the Composition A solution was first filtered and clarified. The solution was then pumped to an ascending film vacuum evaporator in order to concentrate the solution below atmospheric pressure, typically 140–200 mm Hg absolute, to lower its boiling point to 45°–60° C. through the provision of steam at a pressure of 10 k/cm². The resulting concentration ratio is in the range of 1.5:1 to 3.5:1, and the solution will hereinafter be referred to as "Composition B."

In the following examples, the calcium and ammonium salts are obtained as the resulting solution through various methods.

EXAMPLE IV

The polyhydroxycarboxylic acids solution, Composition B, obtained previously was treated with $Ca(OH)_2$ (calcium hydroxide) in such quantity as to obtain a pH of 6.0–8.0 in a rubber lined reactor while the temperature was maintained at or below 60° C. The addition of a calcium nitrate solution is optional when it is desired to raise the calcium content to a range from 1.0 to 5.0%

Ca. This solution was agitated for a period sufficient to obtain a constant pH. The solution was allowed to stand, cool, and then decanted and pumped to storage. This solution will hereinafter be referred to as "Composition C."

EXAMPLE V

In this example, Compositon B was treated with ammonia gas by bubbling the gas into the solution with a stainless steel injector until a pH of 6.0 to 8.0 was obtained. Again, the temperature of the solution was held at or below 60° C. while the solution was agitated until a constant pH was obtained. At this point, the solution was cooled, decanted and pumped to storage. This solution will hereinafter be referred to as "Composition D."

EXAMPLE VI

In this example, Composition B was treated with activated carbon to decolor the solution, while agitating for 30 min. to 2.0 hours at a temperature of 40°–60 ° C. Floculating agents were added, and the mixture was agitated for an additional 15–30 minutes followed by a period of standing, cooling, and decanting in order to settle solid particles.

The solution was then filtered and more naturally occurring dicarboxylic acids, such as glutaric acid, were added to adjust total carboxylic acids content to 4.5–5.5% w/w. The resulting solution was pumped to storage. This solution will hereinafter be referred to as "Composition E."

EXAMPLE VII

Concentrated acetic acid, neutralized with solid potassium hydroxide, and water were added to adjust potassium acetate concentration to 63–67% w/w. Composition E was then added to adjust total carboxylic acids concentration to 2.5–3.5% w/w, and potassium content to 8–15% $K_2O$. This solution was allowed to stand, and then decanted and filtered. The now clear solution was then pumped to storage. This solution will hereinafter be referred to as "Compositon F."

EXAMPLE VIII

Composition E was mixed with solid calcium chloride sufficient to attain a calcium concentration of 7.5–8.5% Ca and total carboxylic acids of 2.5–3.5% w/w. The resulting mixture was allowed to stand, and then decanted and filtered. The cooled, clear solution was then pumped to storage. This solution will hereinafter be referred to as "Composition G."

EXAMPLE IX

A mixture of naturally occurring dicarboxylic acids was added to Composition E to adjust the total carboxylic acids content to 5.5–6.5% w/w in the final product. The following materials were then added to this solution to obtain the indicated results: calcium chloride was added in a quantity sufficient to attain 7.5–8.5% Ca in the final product; boron salt was added in a quantity sufficient to attain 0.3–0.5% B in the final product; and surfactant materials were added in a quantity sufficient to attain a final concentration of 0.4–0.6% w/w in the final product. The resulting mixture was then allowed to stand, decanted and filtered. The now clear solution was thereafter pumped to storage. This solution will hereinafter be referred to as "Composition H."

EXAMPLE X

Composition B was mixed with other naturally occurring dicarboxylic acids, such as glutaric acid, to attain a final total carboxylic acids content of 12.0–13.0% w/w. To this solution sufficient activated carbon was added to decolor the solution, the mixture being agitated for a period of 30 min to 2.0 hrs at a temperature of 40°–60° C. A polyacrilamide compound, a floculating agent, was then added, and the mixture was agitated for a period of 15–30 min. The resulting mixture was then allowed to stand, cool, and was decanted and filtered. To the now clear solution, additional floculating agent was added in a quantity sufficient to attain 2–5% w/w in the final product, and the mixture was mixed at a temperature of 40°–60° C. until the floculating agent was completely incorporated. This final mixture was then filtered, cooled and the clear solution was pumped to storage. This solution will hereinafter be referred to as "Composition I."

EXAMPLE XI

Composition E was mixed with other naturally occurring dicaraboxylic acids, such as glutaric acid, in sufficient quantity as to attain 4.5–5.5% w/w total carboxylic acids in the final product. Iron, copper, manganese, magnesium and zinc sulphates were then added to the acid solution together with a boron salt, in sufficient quantities to attain final product concentrations of 0.1–2.5% w/w of each listed element. The final mixture was allowed to stand and cool, and was decanted and filtered. The final product was then pumped to storage. The solution will hereinafter be referred to as "Composition J."

EXAMPLE XII

Spent rice and/or oat hulls utilized in the process detailed in Examples I and II were mixed with more dicarboxylic acids to attain a final product concentration of 12.0–13.0% w/w of total carboxylic acids. Urea, glucose and gypsum were then added to aid in the agglomeration and compaction of the final granules. Next, a neutralizing material was added in a sufficient quantity to raise the pH of the mixture to 5.5–6.5. The mixture was then granulated and dried to obtain a solid product of 8–14 mesh. This final product was then packed and stored. This granulated material will hereinafter be referred to as "Composition K."

EXAMPLE XIII

Composition B was mixed with spent rice and/or oat hulls and with more dicarboxylic acids to attain 4.5–5.5% w/w total carboxylic acids in the final product. Iron, copper, manganese, magnesium and zinc sulphates were then added to the acid solution together with a boron salt, in sufficient quantities to attain final product concentrations of 0.1–2.5% w/w of each listed element. A specific quantity, 8–10% w/w, of urea was then added to attain good agglomeration and compaction of the final granulated product. The mixture was then granulated and dried to attain a final product of 8–14 mesh. Thereafter, the granulated product was packed and stored. This granulated material will hereinafter be referred to as "Composition L."

EXAMPLE XIV

Composition B was mixed with activated carbon to decolor the solution, and the solution was filtered to attain a clear solution. To increase the concentration of active ingredients this solution was mixed with other naturally plant occurring dicarboxylic acids to attain a final total carboxylic acids content of 40-45% w/w in the product. This solution will hereinafter be referred to as "Composition M."

Methods for use of plant growth biostimulating and soil conditioning compositions will be hereinafter described.

In accordance with the objects and principles of the present invention, plants and soil are treated with single and multiple applications of effective amounts of the plant growth biostimulating and soil conditioning compositions produced by the processes hereof, diluted as necessary for selected rates of application thereof. In general, the compositions are most effective if applied as an integral system by means of soil application, foliar and fruit treatments.

The effect of the compositions on the growth of plants and fruit filling and quality enhancement is on carbohydrate metabolismn as shown by field test results, but still to be demonstrated in continuous basic research. The effect of soil conditioning compositions is of a physicochemical nature, easing plantule emergence and water penetration. The compositions produced by the processes of the present invention have been found to be compatible with, and complementary to, various fertilizers and growth regulators.

These compositions produce noticeable and consistent increases in crop yield on a wide variety of plants, particularly when applied at specific phenological stages. In order to fully disclose the method of use of the compositions provided by the present invention still more fully, attention is invited to the following illustrative examples. The following examples are intended to be illustrative, and the invention is not to be limited to the specific conditions or details set forth in the examples. In these examples, abbreviations may be used for the sake of space. These may include "C." for "Composition," and "Ac." for "Acre."

EXAMPLE XV

The effects of Compositions E and M were evaluated on cantaloupe melon plants growing at a spacing of 60 inches on furrows. in soil characterized as a silty clay. The test was conducted in three trials: the first consisted in four foliar applications of Composition E every 10 days, beginning at bloom; the second consisted in four foliar applications of Composition M every 10 days, beginning at bloom; and the third consisted served as control, with no application of either composition. The fertilizing program of the plants was common to all, and consisted of the addition of nitrogen and phosphorus at planting time, and the application of calcium during vegetative growth.

The experiment design involved a randomized complete block with four replications. The parameter under evaluation was crop yield. It will be apparent upon review of the data contained in Table I, that the plants treated with Compositions E and M evidenced a substantial increase in crop yield over the control plants.

TABLE I

| Treatment | Rate of Application | Yield (Ton/Ac) | % of Control Yield |
|---|---|---|---|
| Untreated | | 6.34 | 100 |
| Composition E | 4 applications 1 Qt/Ac/appl. every 10 days | 8.65 | 136 |
| Compositon M | 4 applications 3 oz/Ac/appl. every 10 days | 7.72 | 122 |

EXAMPLE XVI

The effects of Compositions E and M on potato were experimentally tested and the results are set forth in Table II below. In Trial I, three foliar applications of 1 Qt/Ac of Composition E were made every 15 days, the first being applied at the six-leaf stage. In Trial II, three foliar applications of 3 oz/AC of Composition M were made every 15 days, the first being at the six-leaf stage. Trial III was the control, with no application of either composition. The experimental design consisted of a randomized complete block with three replications and the parameters under evaluation were total yield and commercial yield, being first grade sizes.

The data reflected in Table II evidence a substantial increase in drop yield with better response in quality yield. The Foliar Analysis section of Table II also shows a consistent increase in foliar nutrient content as a result of the application of Compositions E and M.

TABLE II

| Trial | Total Yield (Ton/Ac) | % of Control | Comm'l Yield (Ton/Ac) | % of Control |
|---|---|---|---|---|
| I | 14.42 | 131 | 9.12 | 127 |
| II | 14.49 | 132 | 11.53 | 160 |
| III | 10.96 | 100 | 7.20 | 100 |

Foliar (Petiole) Analysis Section:

| | Nutrient Content | | | | % of Control Nutrient | | | |
|---|---|---|---|---|---|---|---|---|
| Trial | % Ca | % K | % Mg | B ppm | Ca | K | Mg | B |
| I | 1.87 | 13.1 | 0.52 | 92 | 113 | 164 | — | 368 |
| II | 1.80 | 9.86 | 0.56 | 47 | 109 | 123 | 110 | 188 |
| III | 1.65 | 7.99 | 0.51 | 25 | 100 | 100 | 100 | 100 |

EXAMPLE XVII

The effects of Composition I in clay with prior clustering problems was evaluated in laboratory soil-packed columns with three irrigations applied and timing the percolation of a specific amount of water at constant water table and field capacity. In this test, Composition I was applied on lettuce plants planted in a similar soil type with clustering problems and evaluation was carried on plant emergence and crop yield. Composition I was applied at a rate of 10 Qt/Ac.

The experimental design consisted of a randomized complete block with three replications. A substantial yield increase and plant emergence improvement with the application of Composition I will be evident upon review of Table III, below. The data on hydraulic conductivity show the positive effects of the conditioning of the soil in better water penetration which leads to enhanced plant development.

TABLE III

| Trial | Hydr. Cond. Irrigations | | | Emergence (pl/Ac) | % of Control Emergence | Yield (Ton/Ac) | Control Yield |
|---|---|---|---|---|---|---|---|
| | 1st | 2nd | 3rd | | | | |
| C.I | 1.56 | 1.00 | 0.97 | 15,833 | 152 | 10.1 | 158 |

TABLE III-continued

| Trial | Hydr. Cond. Irrigations 1st | 2nd | 3rd | Emergence (pl/Ac) | % of Control Emergence | Yield (Ton/Ac) | Control Yield |
| --- | --- | --- | --- | --- | --- | --- | --- |
| Con. | 0.54 | 0.40 | 0.28 | 10,416 | 100 | 6.4 | 100 |

The percent improvement in hydraulic conductivity over the control, respectively for each irrigation was 289; 250; and 346.

EXAMPLE XVIII

In this test, Compositions G and H were applied on tomato plants in a field test designed to evaluate the effects of these liquid compositions. Here, two 1.5 Qt/Ac foliar applications of Composition G were made every 15 days, the first application being made just before flowering; and three foliar applications of Composition H at a rate of 1.5 Qt/Ac were made every 15 days, the first occurring at the initiation of fruit filling. A control group was maintained, without application of any composition.

The experimental design consisted of a randomized complete block with six replications. The evaluated parameters were yield, quality, nutrient uptake, and shelf-life.

The data in Table IV evidence a very substantial crop yield increase, this increase being higher for commercial sizes in comparison with small sizes. The data also show a consistent increase in fruit nutrient uptake for the treated plants. A useful and important effect is seen in the shelf-life increase.

TABLE IV

| Trial | Yield (box/Ac) Ex. Lg. | Lg. | Med. | Sm. | % Control Yield Ex. Lg. | Lg. | Med. | Sm. |
| --- | --- | --- | --- | --- | --- | --- | --- | --- |
| C.G & H | 224 | 215 | 500 | 300 | 145 | 203 | 132 | 134 |
| Cont'l | 154 | 106 | 380 | 224 | 100 | 100 | 100 | 100 |

| | % Useful Fruit 22 days after harvest | Fruit Analysis % Ca | % K | % Mg | B ppm | % Cont'l Nutrient Ca | K | Mg | B |
| --- | --- | --- | --- | --- | --- | --- | --- | --- | --- |
| C.G & H | 40 | 0.19 | 4.36 | 0.23 | 12.7 | 119 | 105 | 115 | 141 |
| Cont'l | 0 | 0.16 | 4.16 | 0.20 | 9.0 | 100 | 100 | 100 | 100 |

EXAMPLE XIX

The effects of several combinations of compositions, both solid and liquid, were evaluated on pole tomato plants in a demonstrative plot. The resulting trials are set forth in Scheme I, and the data are set forth in Table V. These data show that the better yield and quality results are obtained with the soil-preplant, foliar flowering, fruit filling system combination (Trial 7).

The following doses of compositions were applied as follows:

Composition K=20 lb/Ac. Composition L=20 lbs/Ac.

Composition E=1 Qt/Ac. Composition F=1 Qt/Ac.

Composition J=1 Qt/Ac. Composition H=1.5 Qt/Ac.

SCHEME I:

| Trial | Pre-plant | STAGE Plant Growth | Flowering | Fruit Growth |
| --- | --- | --- | --- | --- |
| 1 | C. K & L | — | — | — |
| 2 | C. K & L | C. E | C. E | C. E |
| 3 | — | C. E | C. E | C. E |

SCHEME I: -continued

| Trial | Pre-plant | STAGE Plant Growth | Flowering | Fruit Growth |
| --- | --- | --- | --- | --- |
| 4 | — | C. F & H | C. F & H | C. H |
| 5 | C. K & L | C. F & H | C. F & H | C. H |
| 6 | C. K & L | C. J | C. J | C. J |
| 7 | — | C. J | C. J | C. J |
| 8 | Control | Control | Control | Control |

TABLE V

| Trial | Yield (Ton/Ac.) | Firmness (lbs) |
| --- | --- | --- |
| 1 | 21.2 | 4.2 |
| 2 | 23.7 | 4.3 |
| 3 | 22.4 | 4.1 |
| 4 | 23.4 | 4.7 |
| 5 | 25.8 | 4.9 |
| 6 | 25.5 | 4.2 |
| 7 | 21.4 | 4.1 |
| 8 | 21.0 | 3.9 |

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing a mixture of polyhydroxycarboxylic acids, carbohydrates, and alcohols with plant growth regulating and fruit development properties, consisting essentially of the steps of:

extracting pentoses from glucoxylane hemicellulose containing seed hulls selected from the group consisting of rice hulls, oat hulls and a mixture of rice hulls and oat hulls with a diluted solution of nitric acid having a liquid/solid ratio of 3:1 to 5:1;

injecting steam into the extracted pentoses and hull solids, said steam having a pressure of 7.0 to 9.0 kg/cm$^2$ to agitate said mixture and to raise the temperature of said mixture to a temperature of 75°–85° C. for a period of 8–20 hours, thereby oxidizing said pentoses in the solution to polyhydroxycarboxylic acids and oxidation products and forming spent solids;

adding additional nitric acid to said polyhydroxycarboxylic acids and oxidation products of said solution to further oxidize extracted pentoses into polyhydroxycarboxylic acids; and clarifying and concentrating said polyhydroxycarboxylic acids and said oxidation solution by evaporating said polyhydroxycarboxylic acids and said oxidation products at a pressure of 145–200 mm Hg absolute and a maximum temperature of 45°–60° C. to make a clarified product extract.

2. The method according to claim 1 further comprising the step of:

adding to said clarified product sufficient calcium hydroxide to obtain a pH ob 6.0–8.0, at a temperature not exceeding 60° C.

3. The method according to claim 2, further comprising the step of:

adding to said clarified product sufficient calcium nitrate to raise the calcium content of said product to 1.0–1.5% Ca.

4. The method according to claim 1 further comprising the step of:

bubbling ammonia gas through said clarified product until a pH of 6.0–8.0 is attained, at a temperature below 60° C.

5. The method according to claim 1 further comprising the step of:

adding to said clarified product a sufficient amount of other carboxylic acids to raise total acid content to 4.5-5.5%.

6. The method as described in claim 5 further comprising the steps of:

combining the acid enhanced liquid composition with a sufficient quantity of a potassium salt solution to adjust the potassium content to 8–15% $K_2O$ and total carboxylic acids to 2.5–3.5%.

7. The method as described in claim 5 further comprising the steps of:

combining the acid enhanced liquid composition with a sufficient quantity of calcium chloride to adjust the calcium concentration to 7.5–8.5% Ca and the total carboxylic acids to 2.5–3.5%.

8. The method as described in claim 5 further comprising the steps of:

combining the acid enhanced liquid composition with a sufficient quantity of dicarboxylic acids, calcium chloride, a boron salt, and surfactant materials to adjust the final carboxylic acids content to 5.5–6.5%, the calcium content to 7.5–8.5% Ca, the boron content to 0.3–0.5% B, and the surfactant material content to 0.4–0.6%.

9. The method as described in claim 5 further comprising the steps of:

combining the acid enhanced liquid composition with a sufficient quantity of dicarboxylic acids and sulphates of iron, copper, manganese, magnesium and zinc, and a boron salt, in sufficient quantities to attain final concentrations of 4.5–5.5% total carboxylic acids and 0.1–2.5% of each of the metallic elements and boron, and filtering said liquid composition.

10. The method according to claim 1 further comprising the steps of:

combining said spent rice and/or oat hulls with additional dicarboxylic acids, glucose, gypsum, and urea;

adding a neutralizing material to form a neutralized mixture;

granulating said neutralized mixture; and drying said granules to form a granular product exhibiting a final concentration of 12.0–13.0% total carboxylic acids, a pH of 5.5–6.5, and a size within the range of 8–14 mesh.

11. The method according to claim 1 further comprising the steps of:

combining said spent rice and/or oat hulls with additional dicarboxylic acids;

adding sulphates of zinc, and a boron salt;

mixing said combination;

adding urea to said combination and mixing to form a granulatable mixture containing metallic elements, boron, urea and spent hulls;

granulating said granulatable mixture; and drying said granules to attain a solid product exhibiting 4.5–5.5% total carboxylic acids, 0.1–2.5% metallic elements and boron, and a size of about 8–14 mesh.

12. The method according to claim 1 further comprising the step of:

adding to said clarified product a sufficient amount of other carboxylic acids to raise total acid content to a final concentration of 40–45% total carboxylic acids.

* * * * *